(12) United States Patent
Sonnier et al.

(10) Patent No.: US 10,941,870 B1
(45) Date of Patent: Mar. 9, 2021

(54) FLUID THROTTLING VALVE

(71) Applicant: AGI INDUSTRIES, INC., Lafayette, LA (US)

(72) Inventors: Bryan T. Sonnier, Lafayette, LA (US); Christopher F. Rooney, Gordonville, TX (US)

(73) Assignee: AGI INDUSTRIES, INC., Lafayette, LA (US)

( * ) Notice: Subject to any disclaimer, the term of this patent is extended or adjusted under 35 U.S.C. 154(b) by 33 days.

(21) Appl. No.: 16/542,564

(22) Filed: Aug. 16, 2019

Related U.S. Application Data (63) Continuation-in-part of application No. 15/839,796, filed on Dec. 12, 2017, now Pat. No. 10,344,891.

(60) Provisional application No. 62/433,123, filed on Dec. 12, 2016.

(51) Int. Cl.
  *F16K 3/08*  (2006.01)
  *F16K 3/02*  (2006.01)

(52) U.S. Cl.
  CPC .............. *F16K 3/08* (2013.01); *F16K 3/0209* (2013.01); *F16K 3/0254* (2013.01)

(58) Field of Classification Search
  CPC ......... F16K 3/08; F16K 3/0209; F16K 3/0254
  USPC ..................... 251/209; 137/625.31
  See application file for complete search history.

(56) References Cited

U.S. PATENT DOCUMENTS

| | | | | | |
|---|---|---|---|---|---|
| 3,207,181 | A | ‡ | 9/1965 | Elizabeth ................ | F16K 3/08 137/625.31 |
| 4,098,294 | A | ‡ | 7/1978 | Woods ..................... | F15D 1/00 137/614.11 |
| 4,337,788 | A | ‡ | 7/1982 | Seger ...................... | E21B 34/02 137/315.02 |
| 4,395,019 | A | * | 7/1983 | Searles ................. | F16K 27/045 251/357 |
| 4,540,022 | A | ‡ | 9/1985 | Cove ...................... | E21B 34/02 137/62 |
| 4,603,834 | A | ‡ | 8/1986 | Hendrick ................. | F16K 3/08 137/625.31 |
| 4,638,833 | A | ‡ | 1/1987 | Wolcott, II ............. | E21B 34/02 137/31 |
| 4,926,898 | A | ‡ | 5/1990 | Sampey .................. | E21B 34/02 137/31 |
| 5,018,703 | A | ‡ | 5/1991 | Goode .................... | F16K 47/08 137/62 |
| 5,063,954 | A | ‡ | 11/1991 | Hendrick ................. | F16K 3/08 137/625.31 |
| 5,217,046 | A | ‡ | 6/1993 | Woods ...................... | F16K 3/08 137/614.11 |
| 5,365,978 | A | ‡ | 11/1994 | Woods ...................... | F16K 3/08 137/31 |

(Continued)

*Primary Examiner* — John Bastianelli
(74) *Attorney, Agent, or Firm* — Ted M. Anthony (57) ABSTRACT

A throttling valve that allows staged pressure drop increments upstream and/or downstream of a primary flow trim assembly within a valve body to help prevent cavitation and freezing effects. The flow trim assembly can be quickly and efficiently removed from the throttling valve (and repaired or replaced) without requiring disassembly of the throttling valve from a flow line or other fluid conduit, and without requiring removal of an automated actuator. A throttling valve body that allows direct mounting of actuators to the valve without the need for brackets and linkages.

17 Claims, 7 Drawing Sheets

(56) References Cited

U.S. PATENT DOCUMENTS

| | | | | |
|---|---|---|---|---|
| 5,623,966 | A ‡ | 4/1997 | Rodger | F16K 5/0435 |
| | | | | 137/625.32 |
| 5,706,856 | A ‡ | 1/1998 | Lancaster | F16K 47/08 |
| | | | | 137/55 |
| 6,105,614 | A ‡ | 8/2000 | Bohaychuk | F16K 47/08 |
| | | | | 137/62 |
| 6,325,101 | B1 ‡ | 12/2001 | Stoll | F16K 1/52 |
| | | | | 137/62 |
| 6,536,473 | B2 ‡ | 3/2003 | Bohaychuk | E21B 34/02 |
| | | | | 137/62 |
| 6,962,167 | B2 ‡ | 11/2005 | Rogalski | F16K 3/08 |
| | | | | 137/59 |
| 7,426,938 | B2 ‡ | 9/2008 | Bohaychuk | E21B 34/02 |
| 8,171,958 | B2 ‡ | 5/2012 | Morreale | F16K 3/24 |
| 9,297,458 | B1 ‡ | 3/2016 | Corte, Jr. | F16K 1/32 |
| 9,625,055 | B2 ‡ | 4/2017 | Ter Haar | F16K 47/08 |
| 9,709,175 | B2 ‡ | 7/2017 | Beechy | F16K 5/10 |
| 9,759,347 | B2 ‡ | 9/2017 | Elliott | F16K 47/08 |
| 2016/0201811 | A1* | 7/2016 | Hunter | F16K 5/0471 |
| | | | | 166/373 |

\* cited by examiner
‡ imported from a related application

FLUID THROTTLING VALVE

CROSS REFERENCES TO RELATED APPLICATIONS

This application is a continuation-in-part of U.S. non-provisional patent application Ser. No. 15/839,796 filed Dec. 12, 2017, that claims priority of U.S. provisional patent application Ser. No. 62/433,123, filed Dec. 12, 2016, all incorporated by reference herein.

STATEMENTS AS TO THE RIGHTS TO THE INVENTION MADE UNDER FEDERALLY SPONSORED RESEARCH AND DEVELOPMENT

NONE

BACKGROUND OF THE PRESENT INVENTION

1. Field of the Invention

The present invention pertains to a throttling valve used to control the flowing pressure and flow rate of a fluid flowing through a pipeline, flow line or other fluid conduit. More particularly, the present invention pertains to a throttling valve that is capable of reducing fluid pressure and flow rate across said valve in a plurality of incremental stages, thereby reducing the negative effects of said pressure drop.

2. Description of Related Art

A throttling valve, which is also sometimes referred to as a control valve or choke valve, is a device that is used to restrict fluid flow rate and/or reduce the pressure of a fluid stream flowing in a pipe, flow line or other conduit. A throttling valve typically has a means for selectively adjusting or varying the amount of restriction imposed on any fluid flowing through the valve.

Throttling valves generally comprise some combination of the following components:

(1) a valve body, an inlet, an outlet and a through bore extending from said inlet to said outlet;
(2) a "flow trim" assembly mounted within said through bore between said inlet and said outlet, for controlling the rate of flow of the fluid in said through bore of said valve body; and
(3) an actuator for manipulating (typically, opening and closing) said flow trim.

Conventional flow trim assemblies generally fall within one of the following broad categories: needle-and-seat; cage-with-internal-plug; cage-with-external-sleeve; and multi-port disk. Each of the aforementioned flow trim types generally functions by restricting an opening in the through bore of said valve body in order to limit or curb flow rate of fluid flowing through said through bore (and said opening). Frequently, the size of said restriction can be selectively adjusted in order to limit fluid flow rate or to create a desired fluid pressure drop across said flow restriction.

Needle-and-seat type flow trims generally comprise a tapered annular seat fixed within a valve body, and a tapered internal plug movably disposed within a through bore for contacting and sealing against said seat surface. The internal plug can be selectively moved relative to said seat surface in order to adjust the size of the restriction (and corresponding opening) in said through bore. As such, the flow rate of fluid flowing through said throttling valve, and the corresponding pressure drop, can be selectively adjusted.

Cage-with-internal-plug flow trims generally comprise a (frequently tubular or cylindrical) cage having a central recess and at least one port extending though side wall(s) of the cage member. The cage member is disposed in the through bore of a valve body, while a plug member is moveably disposed within said central recess of said cage member; movement of said plug member acts to selectively open or close (that is, obstruct/block) said at least one port. In this manner, said cage and plug can be used to adjust the size of the restriction (and corresponding opening) in said through bore. In many cases, said moveable plug member has a tapered surface on the leading edge of the plug member that can contact a sealing seat in order to completely obstruct said through bore and form a fluid pressure seal therein when desired.

Cage-with-external-sleeve flow trims typically comprise a cage member disposed in a through bore of a valve body, wherein said cage member has at least one port extending though side wall(s) of said cage member. A substantially hollow cylindrical sleeve member is slidably disposed over the outer surface of the cage; said sleeve member can be axially moved relative to the cage member in order to expose (open) and cover (close) said ports. By selectively adjusting the amount of port area that is open to fluid flow, the sleeve and cage can cooperate to adjust the size of the restriction (and corresponding opening) in the through bore of the valve body.

Multiple-port-disk flow trims typically comprise a first ported disk having at least one orifice fixedly mounted within the through bore of a valve body. A second ported disk having at least one orifice is rotatably disposed in contiguous—and substantially parallel—relationship to said fixed ported disk. Said second disk can be selectively rotated relative to said first disk, thereby causing the ports (orifices) of the respective disks to move into or out of alignment with each other, as desired. By selectively adjusting the amount of overlapping port/orifice area that is open to fluid flow, said cooperating disks can be used to adjust the size of the restriction (and corresponding opening) in said through bore.

Ideally, all valves (including, without limitation, throttling valves) should be effective, have long life spans and should be easy to operate and maintain. Valve failures can be dangerous, environmentally undesirable, and costly. However, the challenges for throttling valves can be particularly severe due to erosion and/or corrosion of the inner surfaces of valve bodies and the inner components, especially in and around the vicinity of fluid throttling action.

For example, such throttling valves can be exposed to very severe conditions, particularly during use in the oil and gas industry and related applications. Well production fluids frequently contain solids (such as sand-like mineral particles or other debris), brine, and acids. The erosive and corrosive characteristics of such produced well fluids in throttling valves is aggravated by the effects of increased fluid turbulence, impingement on metal surfaces, and a phenomenon known as fluid cavitation.

Conventional means to address or overcome such challenges faced by conventional throttling valves, and to eliminate erosion, corrosion and other harmful effects, have not been completely successful. Notably, it has become common practice to employ erosion and corrosion resistant pistons, sleeves, cages, tapered stem tips, and valve seats made of or plated or lined with tungsten carbide, chrome stainless, stellite, and ceramics in order to resist such harmful effects.

Additionally, it has also become common practice to coat other valve components (such as through bore inlets, inner chambers, and through bore outlets) with such erosion and corrosion resistant materials. Despite such preventive measures, conventional throttling valves continue to suffer from erosion, corrosion and other harmful effects, which can degrade control characteristics and fluid throttling abilities of such valves; this can often make said valves dangerous, unsafe and/or unusable.

Other prevalent issues that can commonly affect many valves in gas service, and throttling valves in particular, is hydrate formation and/or freezing of liquids entrained in said gas. Such negative effects can frequently result from a phenomenon known as the Joule Thomson Effect or "JT effect". In accordance with the JT effect, temperature of a fluid, such as a real gas or liquid, can change significantly when such fluid passes through a throttling valve; notably, the temperature of the fluid can drop drastically when said fluid experiences a rapid pressure drop. Although the JT effect can occur in any valve in which fluid pressure drops dramatically, the JT effect is especially common during the throttling process in throttling valves. The JT effect can cause fluids to freeze (such as, for example, liquids entrained in a gas stream) or hydrates to form which, in turn, can cause valve openings to become restricted or closed off entirely. Such hydrates and frozen fluids can lead to downtime and/or require costly or time consuming remedial operations.

Thus, there is a need for an improved valve that can overcome many of the limitations of conventional throttling valves including, without limitation, hydrate formation and/ or liquid freezing (such as, for example, as a result of the JT effect). Said improved valve should permit actuation through use of either manual handles or automatic actuators, while also providing reliable visual indication of valve actuation and/or position.

SUMMARY OF THE INVENTION

The present invention comprises a throttling valve that addresses the erosion, corrosion, and freezing problems commonly encountered with conventional throttling valves. In a preferred embodiment, the throttling valve of the present invention generally comprises a valve body member having a bore extending through said body member from an inlet to an outlet, and defining an inner flow trim chamber. A multi-port-disk flow trim assembly is mounted within said flow trim chamber, while a handle or automated actuator permits opening and closing of said flow trim.

Virtually all internal components of the throttling valve of the present invention can be accessed, removed and/or replaced without requiring disassembly and/or removal of said throttling valve from a flow line. Further, said internal components can also be accessed, removed and/or replaced without removing said actuator from said valve body, thereby eliminating the need to recalibrate said actuator.

The throttling valve of the present invention utilizes colored markings on the multiple-port-disk flow trim. This capability permits the identification of the flow trim size in the field without the use of tools or gauges in order to facilitate quick, safe, and accurate field maintenance of the valve assembly.

The throttling valve of the present invention also permits the installation/placement of multiple flow orifices both upstream and downstream of a main flow controlling multi-port-disk trim, all within the same valve body. This capability permits fluid pressure throttling to occur in multiple smaller drops or "stages" in order to reduce or eliminate cavitation, as well as temperature loss due to the JT effect.

Further, the throttling valve of the present invention comprises a beneficially configured stem and actuator mounting pad to allow for direct connection of an actuator to said valve body, thereby eliminating the need for bracket and socket linkages. Said stem and actuator mounting pad of the present invention reduce cost, complexity, size requirements, and hysteresis effects. In a preferred embodiment, the throttling valve of the present invention can also include an external actuation indicator that allows for visual indication and confirmation of valve position, even with an actuator directly mounted to said valve body, eliminating the risk of false signal(s) due to a failed actuator.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
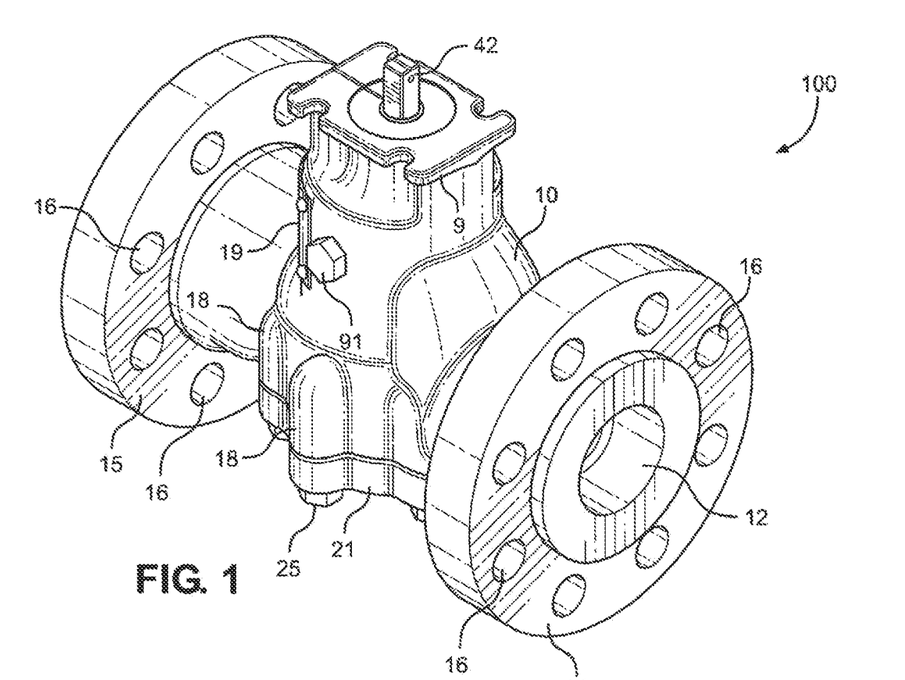
FIG. 1 depicts an overhead perspective view of a throttling valve of the present invention.

FIG. 1 depicts an overhead perspective view of a throttling valve 100 of the present invention. As depicted in FIG. 1, said throttling valve 100 has a handle and/or actuator (used to open/close the valve) removed for clarity. In a preferred embodiment, throttling valve 100 can be installed in-line within a pipeline, flow line or other fluid conduit. Fluid(s) flowing within said pipeline, flow line or other fluid conduit pass through at least one flow restriction formed within said throttling valve 100 that throttles or reduces flow rate and flowing pressure of said fluid(s). As described in more detail herein, said throttling valve 100 of the present invention generally comprises a valve body member 10 having a through bore or channel extending through said body member from an inlet to an outlet, and defining a flow trim chamber in the region generally between said inlet and outlet bores.

Still referring to FIG. 1, throttling valve 100 comprises valve body 10 having inlet flange member 14 and outlet flange member 15. Said inlet flange member 14 and outlet flange member 15 each have a plurality of bolt holes 16 extending through said flange members in spaced relationship. Said flange members 14 and 15 can each be joined with a mating flange member of a fluid pipeline, flow line or other conduit (not shown in FIG. 1) having aligned bolt holes, and using threaded bolts or other fasteners disposed through said aligned bolt holes, in a manner well known to those having skill in the art. In this manner, throttling valve 100 can be secured in-line within said pipeline, fluid flow line or other fluid conduit. Nonetheless, it is to be observed that other means of securing said throttling valve 100 within said pipeline, flow line or other fluid conduit (including, without limitation, using means other than end flange members 14 and 15, such as welding or other attachment means) can be employed without departing from the scope of the present invention.

Inlet bore 12 extends through inlet flange member 14 into body member 10. Said body member 10 has upper mounting pad 9. Stem extension neck 42 extends through aligned apertures in mounting pad 9, and is rotatable about its central longitudinal axis relative to body member 10. A valve cartridge having base section 21 is secured to body member 10 using threaded bolts 25 that are received within threaded bores 18 formed within body member 10. Removable drain plug 91 can be received within a drain/injection port in body member 10, while name plate 19 (which can display operational specifications, traceability information or other indicia) can be disposed on an outer surface of said body member 10.

Figure 2:
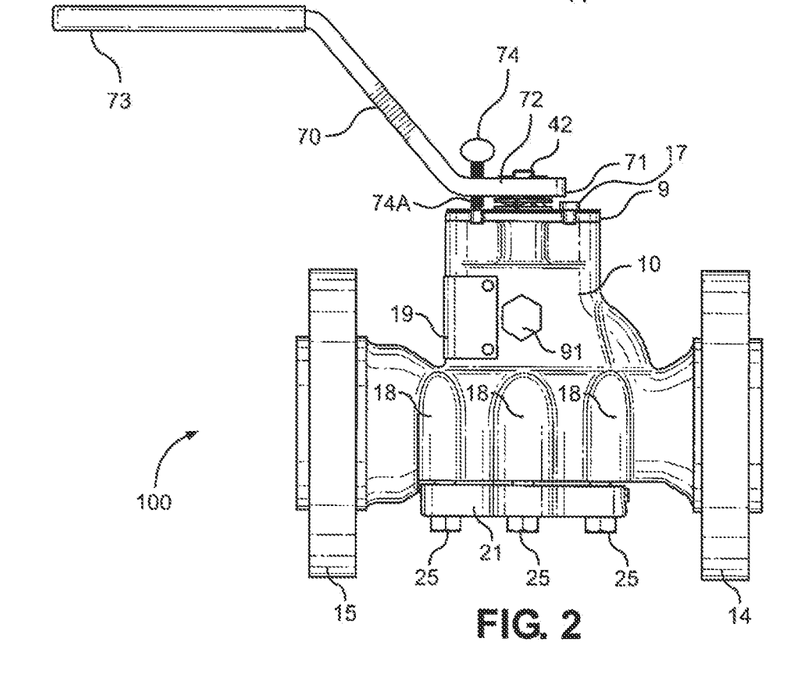
FIG. 2 depicts a side view of a throttling valve of the present invention.

FIG. 2 depicts a side view of a throttling valve 100 of the present invention. Throttling valve 100 comprises valve body 10 having inlet flange member 14 and outlet flange member 15. As described above, said flange members 14 and 15 can each be joined with a mating flange member of a fluid pipeline, flow line or other conduit (not shown in FIG. 2) in order to install throttling valve 100 in-line within said pipeline, fluid flow line or other fluid conduit.

Body member 10 has upper mounting pad 9 and calibration plate 17. Handle 70 has grip section 73 and base section 72 operationally attached to rotatable stem extension neck 42; handle 70 can be used to selectively apply torque (rotational) forces to stem extension neck 42. At least one wave spring 71 biases said base section away from calibration plate 17. Thumb screw 74 having threaded section 74A can be used to selectively lock handle member 70 in place relative to body section 10.

Valve cartridge base section 21 is secured to body member 10 using threaded bolts 25 received and secured within threaded bores 18 formed within body member 10. Removable drain plug 91 is received within a drain port extending from the external surface of body member 10 to an internal flow trim chamber. When said drain plug 91 is removed, said drain port can serve as a fluid pressure bleed port, while also permitting injection of methanol or other substance directly into said inner flow trim chamber and flow trim control surfaces. Name plate 19 is disposed on an outer surface of said body member 10.

Figures 3, 4:
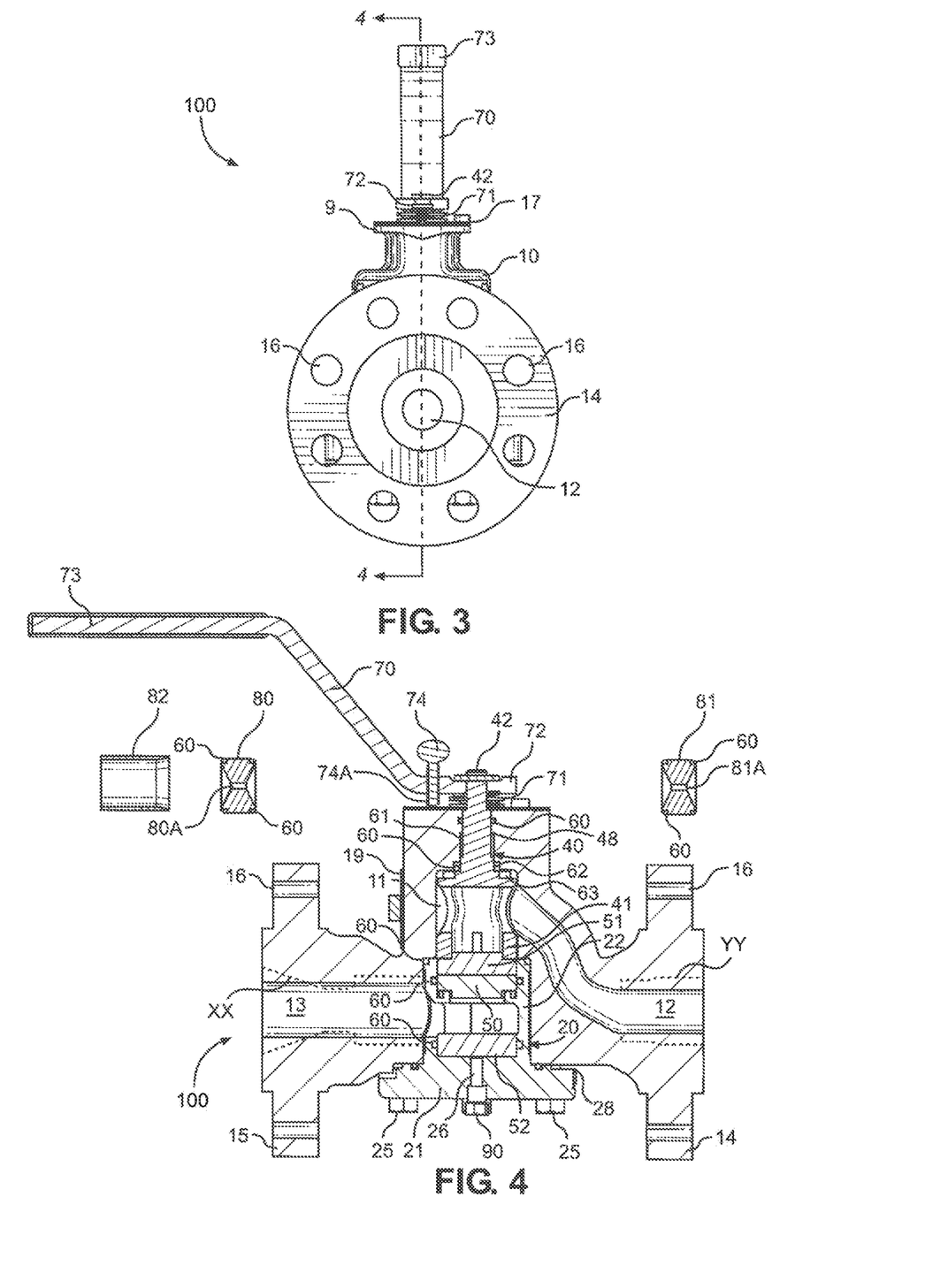
FIG. 3 depicts an end view of a throttling valve of the present invention.
FIG. 4 depicts a side sectional view of a throttling valve of the present invention along line 4-4 of FIG. 3.

FIG. 3 depicts an end view of a throttling valve 100 of the present invention. Throttling valve 100 comprises valve body 10 having inlet flange member 14 having a plurality of bolt holes 16 extending through said flange member in spaced relationship. Inlet bore 12 extends through inlet flange member 14 into body member 10. Said body member 10 has upper mounting pad 9, as well as calibration plate 17 disposed on said upper mounting pad 9.

Stem extension neck 42 of a valve rotator 40 extends through aligned apertures in mounting pad 9 and calibration plate 17, and is rotatable about its central longitudinal axis relative to body member 10. Handle 70 has grip section 73 and base section 72 operationally attached to rotatable stem extension neck 42. At least one wave spring 71 biases said base section 72 off of or away from calibration plate 17.

FIG. 4 depicts a side sectional view of a throttling valve 100 of the present invention along line 4-4 of FIG. 3. Inlet bore 12 extends through inlet flange member 14 into body member 10, while outlet bore 13 extends through outlet flange 15 and into body member 10. Said inlet flange member 14 and outlet flange member 15 each have a plurality of bolt holes 16 extending through said flange members in spaced relationship and can be joined with mating flange members of a fluid pipeline, flow line or other conduit in a manner well known to those having skill in the art.

In the embodiment depicted in FIG. 4, handle 70 has grip section 73 and base section 72 operationally attached to rotatable stem extension neck 42; handle 70 can be used to selectively apply torque (rotational) forces to stem extension neck 42. At least one wave spring 71 biases said base section away from calibration plate 17. Thumb screw 74 having threaded section 74A can be used to selectively lock handle member 70 in place relative to body section 10.

Optional fixed orifice bean 80 has an orifice flow channel 80A having a predetermined cross sectional area; said fixed orifice bean 80 permits a predetermined fluid flow rate through flow channel 80A at a predetermined fluid inlet pressure. Similarly, optional fixed orifice bean 81 has an orifice flow channel 81A having a predetermined cross sectional area; said fixed orifice bean 81 permits a predetermined fluid flow rate through flow channel 81A at a predetermined fluid inlet pressure. Optional downstream cylindrical hub wear sleeve 82 protects inner surfaces of said outlet flow bore 13 from excessive wear due to cavitation, erosion and/or corrosion.

Said fixed orifice bean 80 is removeably received and secured within outlet flow bore 13 utilizing O-rings 60. Throttling valve 100 can be operated with or without hub wear sleeve 82, which snuggly fits within outlet flow bore to protect inner surfaces of said outlet flow bore 13. Similarly, fixed orifice bean 81 is removeably received and secured within inlet flow bore 12 utilizing O-rings 60.

Still referring to FIG. 4, inlet bore 12 and outlet bore 13 each extend into an inner recess or flow trim chamber 11 formed within the central portion of body member 10, generally between or at the junction of said inlet bore 12 and outlet bore 13. Valve rotator member 40 is at least partially received, and rotatably disposed, within said inner flow trim chamber 11, including O-rings 60. Similarly, valve cartridge 20 is at least partially received within said flow trim chamber 11 of body member 10 and secured to body member 10 using threaded bolts 25.

Figure 5:
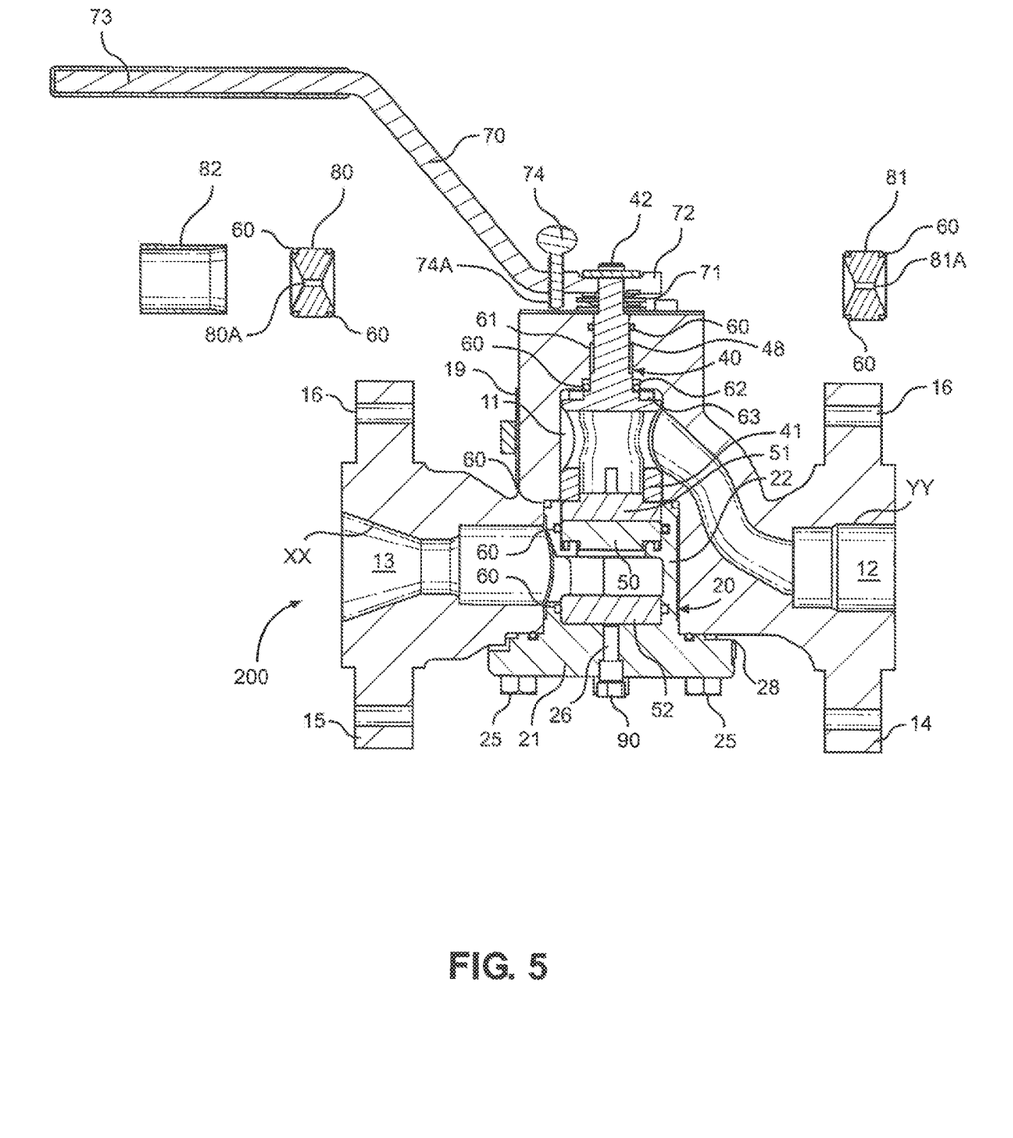
FIG. 5 depicts a side sectional view of an alternative embodiment throttling valve of the present invention along line 4-4 of FIG. 3.

FIG. 5 depicts a side sectional view of an alternative embodiment of throttling valve 200 of the present invention along line 4-4 of FIG. 3. Except as expressly set forth herein, reference numbers used in FIG. 5 refer to the same/like components and features as depicted in FIG. 4. Referring to FIG. 5, fixed orifice bean 80 can be removeably received and secured within an optional pocket (designated as "XX" on FIGS. 4 and 5) of outlet flow bore 13 utilizing O-rings 60. Throttling valve 200 can be operated with or without hub wear sleeve 82, which snuggly fits within outlet flow bore to protect inner surfaces of said outlet flow bore 13. Similarly, fixed orifice bean 81 can be removeably received and secured within optional pocket (designated as "YY" on FIGS. 4 and 5) of inlet flow bore 12 utilizing O-rings 60. It is to be observed that alternative embodiment throttling valve 200 is substantially similar to throttling valve 100, except for the shape and dimensions of optional pocket "XX" of outlet flow bore 13 and optional pocket "YY" of inlet flow bore 12.

Figure 6:
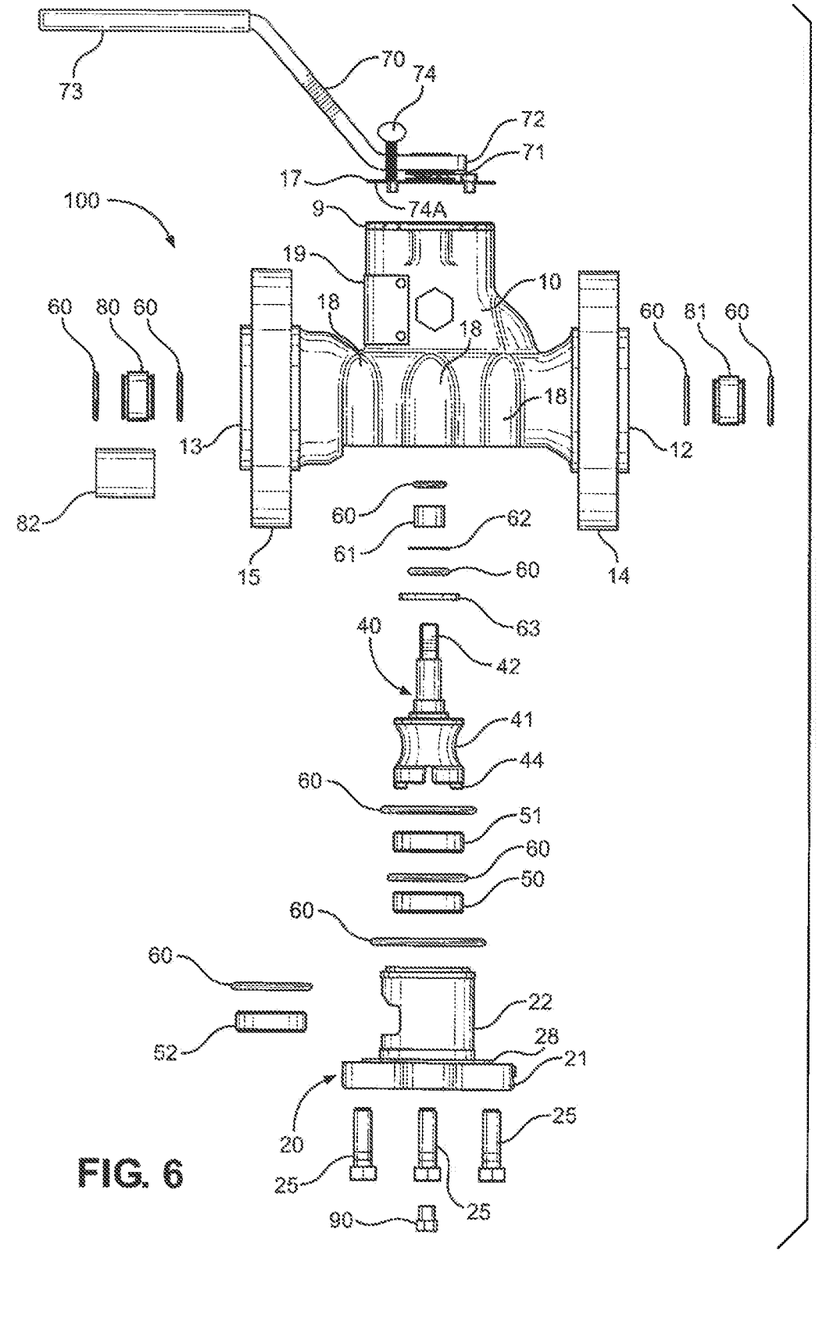
FIG. 6 depicts an exploded side view of a throttling valve of the present invention.

FIG. 6 depicts an exploded side view of a throttling valve 100 of the present invention. Although not visible in FIG. 6, inlet bore 12 extends through inlet flange member 14, while outlet bore 13 extends through outlet flange 15. Said inlet flange member 14 and outlet flange member 15 can each be joined with mating flange members of a fluid pipeline, flow line or other conduit in a manner well known to those having skill in the art.

Handle 70 has grip section 73 and base section 72. Said base section 72 is operationally attached to rotatable stem extension neck 42. At least one wave spring 71 biases said base section 72 of handle 70 off of calibration plate 17. Thumb screw 74 having threaded section 74a can be used to selectively lock handle member 70 in place relative to body section 10.

Body member 10 has a substantially open lower surface extending into inner flow trim chamber 11 (not visible in FIG. 6) within said body member 10. Thrust bearing 63, O-rings 60, back up ring 62, stem bushing 61 are received on valve rotator member 40. In turn, said valve rotator member 40 is at least partially received, and rotatably disposed, within said inner flow trim chamber 11.

O-rings 60 are disposed around the exterior of valve cartridge 20. Said valve cartridge 20 is at least partially received within said flow trim chamber 11 of body member 10. Threaded bolts 25 are received within threaded bores 18 formed in body member 10. Solid wear disk 52 (with O-ring 60), moveable orifice disk 51, and fixed orifice disk 50 (with O-ring 60) are disposed within valve cartridge 20.

Figure 7:
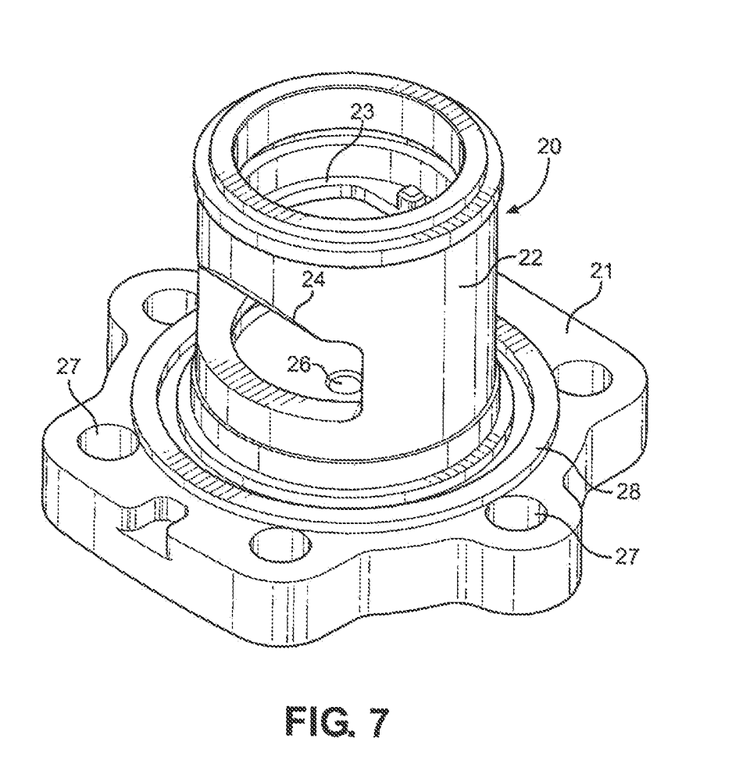
FIG. 7 depicts an overhead perspective view of a valve cartridge of the present invention.
Figure 8:
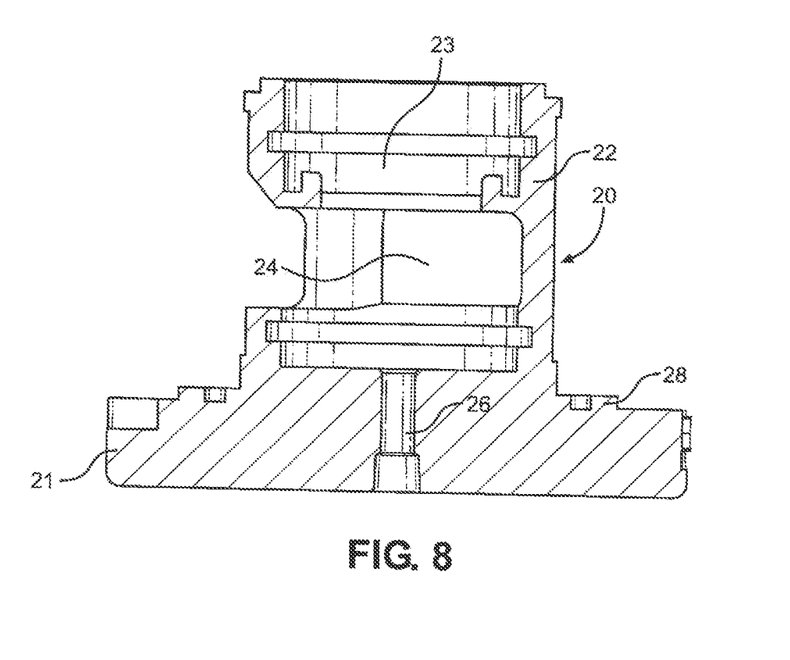
FIG. 8 depicts a side sectional view of a valve cartridge of the present invention.

FIG. 7 depicts an overhead perspective view of said valve cartridge 20 of the present invention, while FIG. 8 depicts a side sectional view of said valve cartridge 20. In a preferred embodiment, said valve cartridge 20 generally comprises substantially planar base 21 having a plurality of bolt holes 27 in spaced relationship around said base. Substantially cylindrical sleeve 22 having a central axial bore 23 extends from base 21, while elongate slotted aperture 24 extends through a side wall of said sleeve 22. Stand-off ring 28 extends around and encircles the outer circumference of said sleeve 22. Pressure transmission channel 26 extends through said base 21 and is in fluid communication with central bore 23.

Figure 9:
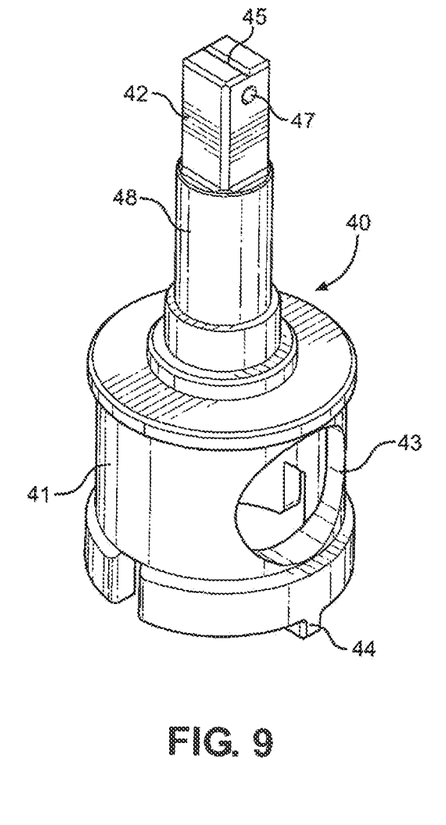
FIG. 9 depicts an overhead perspective view of a valve rotator member of the present invention.
Figure 10:
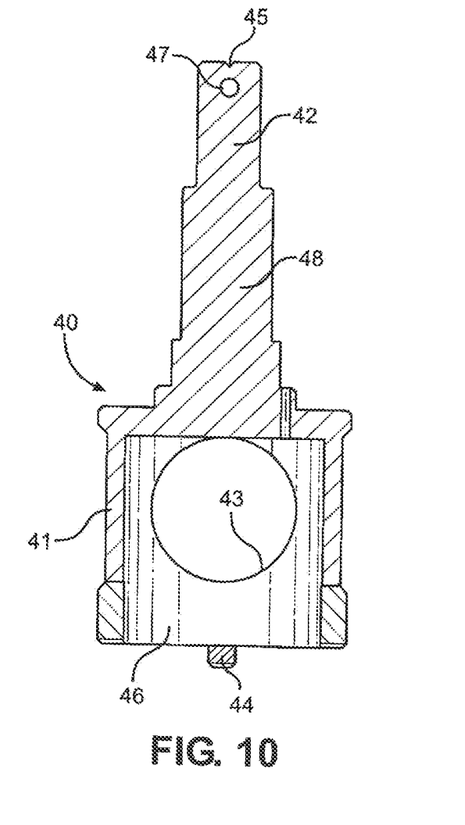
FIG. 10 depicts a side sectional view of a valve rotator member of the present invention.

FIG. 9 depicts an overhead perspective view of said valve rotator 40 of the present invention, while FIG. 10 depicts a side sectional view of said valve rotator 40. In a preferred embodiment, said valve rotator 40 comprises substantially cylindrical base member 41 defining an inner recess 46. Upwardly protruding elongated stem 48 having stem extension neck 42 at its upper or distal end extends from said base member 41. In a preferred embodiment, said stem extension neck also has a substantially square cross-sectional profile, upper groove 45 and transverse through-bore 47. A flow aperture 43 having a desired diameter extends through base member 41 into and out of inner recess 46. Valve rotator 40 also has at least one tab 44 protruding from base member 41 for engaging corresponding slots on a rotating orifice disk, as discussed more fully below.

Referring back to FIG. 4, body member 10 has inner flow trim chamber 11 that defines a recess or opening within said body member 10. Valve rotator member 40 is at least partially received, and rotatably disposed, within said inner flow trim chamber 11. Similarly, valve cartridge 20 is at least partially received within said flow trim chamber 11 of body member 10 and secured to said body member 10 using threaded bolts 25. In a preferred embodiment, stand-off ring 28 of valve cartridge cooperates with the base of body member 10 in order to form a small gap or stand-off distance between base 21 of valve cartridge 20 and body member 10, and prevent flush engagement of said components. Said air gap between base 21 of valve cartridge 20 and body member 10 prevents corrosive gases from saturating bolts 25.

Upper stem extension neck 42 of valve rotator member 40 extends through aligned apertures in body member 10, mounting pad 9 and calibration plate 17; said upper stem extension neck 42 is operationally attached to handle member 70, and is rotatable about its central longitudinal axis relative to body member 10. Valve cartridge 20 is partially received within inner flow trim chamber 11, while base section 21 is secured to body member 10 using threaded bolts 25.

O-rings 60 engage against valve rotator 40 and the inner wall of body member 10 to form a fluid pressure seal, while stem bushing 61, back up ring 62 and thrust bearing 63 are disposed around stem member 48 of said valve rotator 40. Back-up ring 62 helps energize the primary seal of an O-ring 60 between said valve rotator 40 and an inner wall of valve body 10.

Figure 11:
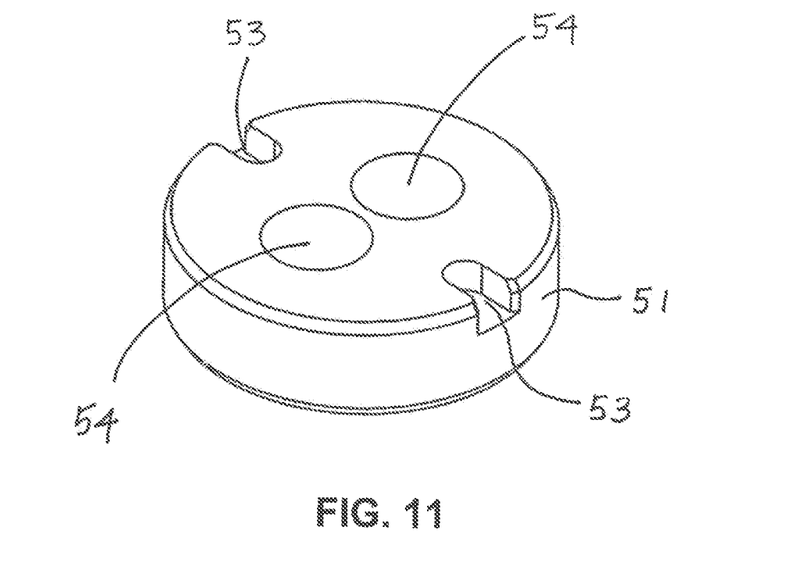
FIG. 11 depicts a side perspective view of a color-coded orifice disk of the present invention.
Figure 12:
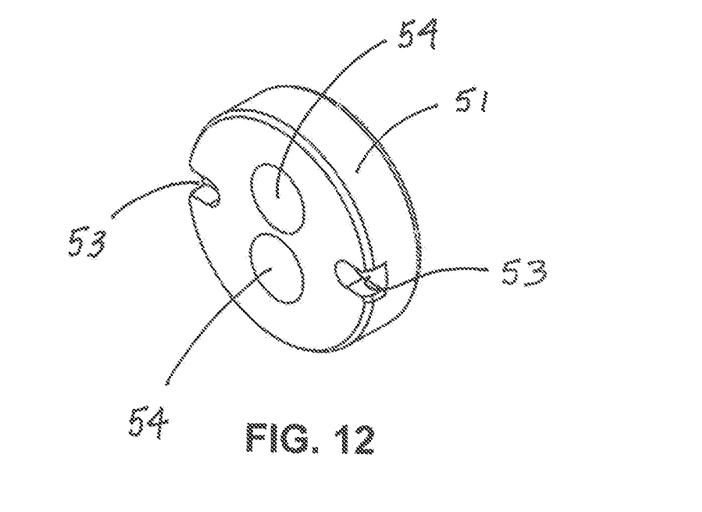
FIG. 12 depicts an alternative perspective view of a color-coded orifice disk of the present invention.

FIG. 11 depicts a side perspective view of a color-coded rotating orifice disk 51 of the present invention, while FIG. 12 depicts an alternative perspective view of said color-coded orifice disk 51. Rotating orifice disk 51 is designed to fit within, and is moveably disposed within, axial bore 23 of valve cartridge 20 downstream of valve rotator 40. Tabs 44 of valve rotator 40 can be received in and engage with corresponding slots 53 on rotating orifice disk 51. When said tabs 44 are engaged within said slots 53, rotating orifice disk 51 rotates within central bore 23 of valve cartridge 20 when torque force is applied to upper stem extension neck 42 and valve rotator 40 is rotated.

Rotating orifice disk 51 also has at least one axial orifice or bore 54 extending through said rotating orifice disk 51, which allows passage of fluid flowing through fluid throttling valve 100, but also restricts the passage of fluid flowing through fluid throttling valve 100, which results in a reduction of flow rate and/or a decrease in pressure of the fluid flowing through fluid throttling valve 100. Said at least one orifice 54 can vary in size and shape depending on the amount of flow restriction or pressure drop that is desired through fluid throttling valve 100. Rotating orifice disk 51 can be color-coded or marked to correspond with a particular size, shape or other configuration of said orifice(s) 54 in order to permit quick and efficient identification or determination of desired characteristics of said orifice(s) 54 in accordance with a predetermined coding system.

Referring back to FIG. 4, fluid throttling valve 100 includes fixed orifice disk 50, which is designed to fit within axial bore 23 of valve cartridge 20 with O-ring 60 downstream of rotating orifice disk 51. Wear disk 52 is installed with O-ring 60. Unlike rotating orifice disk 51, fixed orifice disk 50 is not designed to rotate within axial bore 23 of valve cartridge 20. Like rotating orifice disk 51, fixed orifice disk 50 has at least one axial orifice (similar to orifice(s) 54 of disk 51) extending through said fixed orifice disk 50, which allows passage of fluid flowing through fluid throttling valve 100, but also restricts the passage of fluid flowing through fluid throttling valve 100, which results in a reduction of flow rate and/or a decrease in pressure of the fluid flowing through fluid throttling valve 100. At least one of said orifices can vary in size and shape depending on the amount of flow restriction and/or pressure drop is desired through fluid throttling valve 100. Fixed orifice disk 50, can also be color-coded or marked to correspond with said orifice(s) to identify the size, shape or other configuration of said orifice(s) in accordance with a predetermined coding system.

Color coding of said disks 50 and/or 51 permits quick and efficient identification of relevant disks and/or orifice characteristics without detailed inspection, including during operations conducted in the field or other remote environments. By way of illustration, but not limitation, during maintenance operations a user can quickly and efficiently determine without detailed inspection that a particular disk 50 or 51 has orifice(s) embodying particular sizes, shapes or configurations based on predetermined color-coding. Further, said disk 50 and/or 51 can be selectively changed to another disk corresponding to another predetermined color-code (if, for example, another diameter size, shape or configuration of orifice(s) is desired).

The amount of flow restriction and/or pressure drop through fluid throttling valve 100 can be controlled by selective rotation of moveable orifice disk 51, which changes or adjusts the alignment of orifice(s) 54 in said rotating orifice disk 51 relative to the orifice(s) in fixed orifice disk 50. Maximum flow rate and minimum pressure drop results when the orifices in rotating orifice disk 51 and fixed orifice disk 50 are fully aligned with each other. Conversely, fluid flow rate is restricted, and fluid pressure drop is increased, as orifices in rotating orifice disk 51 and fixed orifice disk 50 become less aligned—that is, when the common area of aligned orifices of said disks are reduced. Fluid flow rate is completely stopped (and fluid pressure drop is complete) when the orifices in rotating orifice disk 51 and fixed orifice disk 50 are misaligned to prevent any passage of fluid through fluid throttling valve 100.

When desired, fluid contained within inner flow trim chamber 11 can be drained through drain channel (not shown) by removal of drain plug 91. When said drain plug 91 is removed, said drain channel (not shown) can serve as a fluid pressure bleed port, while also permitting injection of desired chemical or other substance(s) directly into said inner flow trim chamber 11 near orifice disc to limit dilution of chemical. When wear disc 52 is damaged through wear it will allow passage of fluid to pressure transmission channel 26. This fluid can be removed by removing drain plug 90. Conversely, drain plug 90 can be removed to allow for insertion of a pressure sensor which can send a signal when channel 26 receives fluid. Additionally, when drain plug 90 is removed, an elongate object can be inserted within drain channel 26 in order to contact and "punch" wear disk 52 from central bore 23 of valve cartridge 20.

Actuation of fluid throttling valve 100 can be accomplished through manual handle 70 or via an automated powered (typically electric, pneumatic, or hydraulic) valve actuator well known to those having skill in the art. Unlike conventional throttling valves that use a linkage member to connect the automated actuator to a stem extension neck of a throttling valve automated actuators can be directly mounted to pad 9 of throttling valve 100 allowing direct interaction of automated actuator and stem extension neck 42 of throttling valve 100. Throttling valve 100 may optionally include an external signal or marker displaying valve position (actuation status). As a result, a user will be able to observe the true position of throttling valve 100 even in the event of an internal failure of an automated actuator that may not be visible from the exterior of said automated actuator.

As described herein, throttling valve 100 of the present invention permits installation/placement of multiple orifices both upstream (orifice bean 81) and/or downstream (orifice bean 80) of a main controlling multi-disk flow trim assembly within a single valve body, as desired. As a result, fluid pressure is throttled across said throttling valve in a plurality of smaller increments or "stages". By reducing flowing fluid pressure drops more gradually across said throttling valve 100, the throttling valve of the present invention can reduce or eliminate cavitation, as well as temperature loss due to the JT effect. Further, the magnitude of said pressure drop stages can be increased or decreased, as desired, by changing the size (typically cross-sectional area) of the orifices formed in said orifice beans 80 and 81.

Virtually all internal and flow trim components of throttling valve 100 of the present invention can be accessed, removed and/or replaced (by unscrewing threaded bolts 25 and removing flow cartridge 20 from body member 10) without requiring disassembly and/or removal of said throttling valve 100 from a surrounding flow line, pipeline or other fluid conduit. Further, said internal components can also be accessed, removed and/or replaced without removing or disturbing any operationally attached automated actuator (or handle) from valve body 10, thereby eliminating the need to recalibrate said actuator upon reinstallation.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. A method for throttling fluid pressure of a fluid flow stream comprising:
    a) installing a throttling valve in said flow stream, said throttling valve comprising:
        i) a body having an inlet, an outlet, a central chamber, a bottom opening extending through said body into said central chamber, a first bore extending from said inlet to said central chamber, a second bore extending from central chamber to said outlet, and an upper aperture aligned with said central chamber;
        ii) a valve cartridge having a sleeve section and base plate, wherein said sleeve is partially received within said central chamber; and said base plate is configured to releaseably connect to said body and close said bottom opening iii) a valve rotator having a body section and a stem, wherein said body section is disposed within said central chamber and said stem extends through said upper aperture in said body;

iv) a stationary orifice disk disposed in said sleeve of said valve cartridge;

v) a rotating orifice disk operationally attached to said valve rotator, wherein rotation of said valve stem causes rotation of said rotating orifice disk relative to said stationary orifice disk to selectively open said valve, close said valve, or throttle fluid flow through said valve; and vi) a first fixed orifice bean defining an orifice, disposed in said first bore or said second bore;

b) reducing pressure of said fluid flowing through said throttling valve in a plurality of stages.

2. The method of claim 1, wherein said throttling valve further comprises a second fixed orifice bean defining an orifice, disposed in said first or second bore.

3. The method of claim 2, wherein said first or second orifice beans are replaceable.

4. The method of claim 1, wherein said throttling valve further comprises a handle or actuator operationally attached to said stem of said valve rotator for imparting torque forces to said stem.

5. The method of claim 1, wherein said valve cartridge, stationary orifice disk, rotating orifice disk, or combinations thereof, can be removed from said body without removing said handle or actuator from said stem.

6. The method of claim 1, wherein the magnitude of at least one pressure drop stage is determined by the size of said orifice of said first orifice bean, the size of the said orifice of said second orifice bean, or combinations thereof.

7. A throttling valve comprising:

a) a body having an inlet, an outlet, a central chamber, a first bore extending from said inlet to said central chamber, a bottom opening extending through said body into said central chamber, a second bore extending from central chamber to said outlet, an upper aperture aligned with said central chamber, and a mounting pad wherein said upper aperture is received within said mounting pad;

b) a valve cartridge having a sleeve section and base plate, wherein said sleeve is partially received within said central chamber; and said base plate is configured to releaseably connect to said body and close said bottom opening c) a valve rotator having a body section and a stem, wherein said body section is disposed within said central chamber and said stem extends through said upper aperture in said body;

d) a stationary orifice disk disposed in said sleeve of said valve cartridge;

e) a rotating orifice disk operationally attached to said valve rotator, wherein rotation of said valve stem causes rotation of said rotating orifice disk relative to said stationary orifice disk to selectively open said valve, close said valve, or throttle fluid flow through said valve; and f) a first fixed orifice bean defining an orifice, disposed in said first bore or said second bore.

8. The throttling valve of claim 7, further comprising a second fixed orifice bean defining an orifice, disposed in said first or second bore.

9. The throttling valve of claim 7, further comprising a handle or actuator operationally attached to said stem of said valve rotator for imparting torque forces to said stem.

10. The throttling valve of claim 9, wherein said valve cartridge, stationary orifice disk, rotating orifice disk, or combinations thereof, can be accessed without removing said handle or actuator from said stem.

11. The throttling valve of claim 7, wherein pressure of fluid flowing through said valve is reduced in a plurality of stages between said inlet and said outlet.

12. The throttling valve of claim 11, wherein the magnitude of at least one pressure drop stage is determined by the size of said orifice of said first orifice bean, the size of the said orifice of said second orifice bean, or combinations thereof.

13. A throttling valve comprising:

a) a body having an inlet, an outlet, a central chamber, a bottom opening extending through said body into said central chamber, a first bore extending from said inlet to said central chamber, a second bore extending from central chamber to said outlet, and an upper aperture aligned with said central chamber, and a mounting pad wherein said upper aperture is received within said mounting pad;

b) a valve cartridge having a sleeve section and base plate, wherein said sleeve is partially received within said central chamber; and said base plate is configured to releaseably connect to said body and close said bottom opening c) a valve rotator having a body section and a stem, wherein said body section is disposed within said central chamber and said stem extends through said upper aperture in said body;

d) a stationary orifice disk disposed in said sleeve of said valve cartridge;

e) a rotating orifice disk operationally attached to said valve rotator, wherein rotation of said valve stem causes rotation of said rotating orifice disk relative to said stationary orifice disk to selectively open said valve, close said valve, or throttle fluid flow through said valve;

f) a first fixed orifice bean defining an orifice, disposed in said first bore; and g) a second fixed orifice bean defining an orifice, disposed in said second bore.

14. The throttling valve of claim 13, further comprising a handle or actuator operationally attached to said stem of said valve rotator for imparting torque forces to said stem.

15. The throttling valve of claim 14, wherein said valve cartridge, stationary orifice disk, rotating orifice disk, or combinations thereof, can be removed from said body without removing said handle or actuator from said stem.

16. The throttling valve of claim 13, wherein pressure of fluid flowing through said valve is reduced in a plurality of stages between said inlet and said outlet.

17. The throttling valve of claim 16, wherein the magnitude of at least one pressure drop stage is determined by the size of said orifice of said first orifice bean, the size of the said orifice of said second orifice bean, or combinations thereof.

* * * * *